US008156243B2

(12) United States Patent
Richardson et al.

(10) Patent No.: US 8,156,243 B2
(45) Date of Patent: *Apr. 10, 2012

(54) REQUEST ROUTING

(75) Inventors: David R. Richardson, Seattle, WA (US); John Cormie, Seattle, WA (US); Bradley E. Marshall, Bainbridge Island, WA (US); Elmore Eugene Pope, Sammamish, WA (US); Swaminathan Sivasubramanian, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 441 days.

This patent is subject to a terminal disclaimer.

(21) Appl. No.: 12/059,997

(22) Filed: Mar. 31, 2008

(65) Prior Publication Data
US 2009/0248893 A1    Oct. 1, 2009

(51) Int. Cl.
*G06F 15/173* (2006.01)
(52) U.S. Cl. ........ 709/238; 709/217; 709/231; 709/239; 709/245; 709/246
(58) Field of Classification Search .................. 709/245, 709/246, 217, 231, 238, 239
See application file for complete search history.

(56) References Cited

U.S. PATENT DOCUMENTS

| | | | |
|---|---|---|---|
| 5,341,477 A | 8/1994 | Pitkin et al. | |
| 5,611,049 A | 3/1997 | Pitts | |
| 5,774,660 A | 6/1998 | Brendel et al. | |
| 5,892,914 A | 4/1999 | Pitts | |
| 6,016,512 A | 1/2000 | Huitema | |
| 6,026,452 A | 2/2000 | Pitts | |
| 6,052,718 A | 4/2000 | Gifford | |
| 6,085,234 A | 7/2000 | Pitts et al. | |
| 6,098,096 A | 8/2000 | Tsirigotis et al. | |
| 6,108,703 A | 8/2000 | Leighton et al. | |
| 6,182,111 B1 | 1/2001 | Inohara et al. | |
| 6,205,475 B1 | 3/2001 | Pitts | |
| 6,286,084 B1 | 9/2001 | Wexler et al. | |
| 6,304,913 B1 | 10/2001 | Rune | |
| 6,351,743 B1 | 2/2002 | DeArdo et al. | |
| 6,351,775 B1 | 2/2002 | Yu | |
| 6,363,411 B1 | 3/2002 | Dugan et al. | |
| 6,366,952 B2 | 4/2002 | Pitts | |
| 6,457,047 B1 | 9/2002 | Chandra et al. | |

(Continued)

OTHER PUBLICATIONS

Baglioni et al., "Preprocessing and Mining Web Log Data for Web Personalization", LNAI 2829, 2003, pp. 237-249.

(Continued)

*Primary Examiner* — Carl Colin
*Assistant Examiner* — Harunur Rashid
(74) *Attorney, Agent, or Firm* — Knobbe, Martens, Olson & Bear, LLP (57) ABSTRACT

A system, method and computer-readable medium for request routing. A client request processing a resource identifier for requested content transmits a first DNS query to a content delivery network service provider. The content delivery network service provider transmits an alternative resource identifier in response to the client computing device DNS query. The client computing device then issues a second DNS query to the same content delivery network service provider. The content delivery network service provider can then either resolve the second DNS query with an IP address of a cache component or transmit another alternative resource identifier that will resolve to the content delivery network service provider. The process can repeat with the content delivery network service provider's network until a DNS server resolves a DNS query from the client computing device.

31 Claims, 8 Drawing Sheets

U.S. PATENT DOCUMENTS

| | | |
|---|---|---|
| 6,484,143 B1 | 11/2002 | Swildens et al. |
| 6,505,241 B2 | 1/2003 | Pitts |
| 6,553,413 B1 | 4/2003 | Leighton et al. |
| 6,654,807 B2 | 11/2003 | Farber et al. |
| 6,678,791 B1 | 1/2004 | Jacobs et al. |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,769,031 B1 | 7/2004 | Bero |
| 6,694,358 B1 | 8/2004 | Swildens et al. |
| 6,785,704 B1 | 10/2004 | McCanne |
| 6,804,706 B2 | 10/2004 | Pitts |
| 6,829,654 B1 | 12/2004 | Jungck |
| 6,963,850 B1 | 11/2005 | Bezos et al. |
| 6,981,017 B1 | 12/2005 | Kasriel et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,058,706 B1 | 6/2006 | Iyer et al. |
| 7,065,587 B2 | 6/2006 | Huitema et al. |
| 7,072,982 B2 | 7/2006 | Teodosiu et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,099,936 B2 | 8/2006 | Chase et al. |
| 7,103,645 B2 | 9/2006 | Leighton et al. |
| 7,117,262 B2 | 10/2006 | Bai et al. |
| 7,133,905 B2 | 11/2006 | Dilley et al. |
| 7,146,560 B2 | 12/2006 | Dang et al. |
| 7,152,118 B2 | 12/2006 | Anderson, IV et al. |
| 7,174,382 B2 | 2/2007 | Ramanathan et al. |
| 7,185,063 B1 | 2/2007 | Kasriel et al. |
| 7,188,214 B1 | 3/2007 | Kasriel et al. |
| 7,194,522 B1 | 3/2007 | Swildens et al. |
| 7,200,667 B2 | 4/2007 | Teodosiu et al. |
| 7,225,254 B1 | 5/2007 | Swildens et al. |
| 7,233,978 B2 | 6/2007 | Overton et al. |
| 7,240,100 B1 | 7/2007 | Wein et al. |
| 7,260,598 B1 | 8/2007 | Liskov et al. |
| 7,269,784 B1 | 9/2007 | Kasriel et al. |
| 7,310,686 B2 | 12/2007 | Uysal |
| 7,320,131 B1 | 1/2008 | O'Toole, Jr. |
| 7,321,918 B2 | 1/2008 | Burd et al. |
| 7,363,291 B1 | 4/2008 | Page |
| 7,441,045 B2 | 10/2008 | Skene et al. |
| 7,461,170 B1 | 12/2008 | Taylor et al. |
| 7,464,142 B2 | 12/2008 | Flurry et al. |
| 7,492,720 B2 | 2/2009 | Pruthi et al. |
| 7,499,998 B2 | 3/2009 | Toebes et al. |
| 7,502,836 B1 | 3/2009 | Menditto et al. |
| 7,548,947 B2 | 6/2009 | Kasriel et al. |
| 7,552,235 B2 | 6/2009 | Chase et al. |
| 7,573,916 B1 | 8/2009 | Bechtolsheim et al. |
| 7,624,169 B2 | 11/2009 | Lisiecki et al. |
| 7,653,700 B1 | 1/2010 | Bahl et al. |
| 7,657,622 B1 | 2/2010 | Douglis et al. |
| 7,680,897 B1 | 3/2010 | Carter et al. |
| 7,702,724 B1 | 4/2010 | Brydon et al. |
| 7,739,400 B2 | 6/2010 | Lindbo et al. |
| 7,747,720 B2 | 6/2010 | Toebes et al. |
| 7,756,913 B1 | 7/2010 | Day |
| 7,761,572 B1 | 7/2010 | Auerbach |
| 7,774,342 B1 | 8/2010 | Virdy |
| 7,792,989 B2 | 9/2010 | Toebes et al. |
| 7,813,308 B2 | 10/2010 | Reddy et al. |
| 7,818,454 B2 | 10/2010 | Kim et al. |
| 7,836,177 B2 | 11/2010 | Kasriel et al. |
| 7,912,921 B2 | 3/2011 | O'Rourke et al. |
| 7,925,782 B2 | 4/2011 | Sivasubramanian et al. |
| 7,962,597 B2 | 6/2011 | Richardson et al. |
| 7,991,910 B2 | 8/2011 | Richardson et al. |
| 8,028,090 B2 | 9/2011 | Richardson et al. |
| 2001/0034704 A1 | 10/2001 | Farhat et al. |
| 2001/0049741 A1 | 12/2001 | Skene et al. |
| 2001/0056416 A1* | 12/2001 | Garcia-Luna-Aceves ........ 707/2 |
| 2001/0056500 A1 | 12/2001 | Farber et al. |
| 2002/0007413 A1 | 1/2002 | Garcia-Luna-Aceves et al. |
| 2002/0048269 A1 | 4/2002 | Hong et al. |
| 2002/0049608 A1 | 4/2002 | Hartsell et al. |
| 2002/0052942 A1 | 5/2002 | Swildens et al. |
| 2002/0062372 A1 | 5/2002 | Hong et al. |
| 2002/0068554 A1 | 6/2002 | Dusse |
| 2002/0078233 A1 | 6/2002 | Biliris et al. |
| 2002/0087374 A1 | 7/2002 | Boubez et al. |
| 2002/0092026 A1 | 7/2002 | Janniello et al. |
| 2002/0099616 A1 | 7/2002 | Sweldens |
| 2002/0101836 A1 | 8/2002 | Dorenbosch |
| 2002/0129123 A1 | 9/2002 | Johnson et al. |
| 2002/0138286 A1 | 9/2002 | Engstrom |
| 2002/0147770 A1 | 10/2002 | Tang |
| 2002/0188722 A1 | 12/2002 | Banerjee et al. |
| 2003/0002484 A1 | 1/2003 | Freedman |
| 2003/0009591 A1 | 1/2003 | Hayball et al. |
| 2003/0037139 A1 | 2/2003 | Shteyn |
| 2003/0065739 A1 | 4/2003 | Shnier |
| 2003/0074401 A1 | 4/2003 | Connell et al. |
| 2003/0101278 A1 | 5/2003 | Garcia-Luna-Aceves et al. |
| 2003/0133554 A1 | 7/2003 | Nykanen et al. |
| 2003/0135509 A1 | 7/2003 | Davis et al. |
| 2003/0140087 A1 | 7/2003 | Lincoln et al. |
| 2003/0145066 A1 | 7/2003 | Okada et al. |
| 2003/0149581 A1* | 8/2003 | Chaudhri et al. ................. 705/1 |
| 2003/0163722 A1 | 8/2003 | Anderson, IV |
| 2003/0172183 A1 | 9/2003 | Anderson, IV et al. |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0236700 A1 | 12/2003 | Arning et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0034744 A1 | 2/2004 | Karlsson et al. |
| 2004/0044791 A1 | 3/2004 | Pouzzner |
| 2004/0073867 A1 | 4/2004 | Kausik et al. |
| 2004/0078487 A1 | 4/2004 | Cernohous et al. |
| 2004/0083307 A1* | 4/2004 | Uysal ........................... 709/246 |
| 2004/0117455 A1 | 6/2004 | Kaminsky et al. |
| 2004/0128344 A1 | 7/2004 | Trossen |
| 2004/0172466 A1 | 9/2004 | Douglas et al. |
| 2004/0203630 A1 | 10/2004 | Wang |
| 2004/0205149 A1 | 10/2004 | Dillon et al. |
| 2004/0215823 A1 | 10/2004 | Kleinfelter et al. |
| 2004/0249971 A1 | 12/2004 | Klinker |
| 2004/0249975 A1 | 12/2004 | Tuck et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0038967 A1 | 2/2005 | Umbehocker et al. |
| 2005/0044270 A1 | 2/2005 | Grove et al. |
| 2005/0108169 A1 | 5/2005 | Balasubramanian et al. |
| 2005/0132083 A1 | 6/2005 | Raciborski et al. |
| 2005/0188073 A1 | 8/2005 | Nakamichi et al. |
| 2005/0192008 A1 | 9/2005 | Desai et al. |
| 2005/0232165 A1 | 10/2005 | Brawn et al. |
| 2005/0262248 A1 | 11/2005 | Jennings, III et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2006/0013158 A1 | 1/2006 | Ahuja et al. |
| 2006/0020715 A1 | 1/2006 | Jungck |
| 2006/0026067 A1 | 2/2006 | Nicholas et al. |
| 2006/0026154 A1 | 2/2006 | Altinel et al. |
| 2006/0064500 A1 | 3/2006 | Roth et al. |
| 2006/0074750 A1 | 4/2006 | Clark et al. |
| 2006/0075139 A1 | 4/2006 | Jungck |
| 2006/0083165 A1 | 4/2006 | McLane et al. |
| 2006/0112176 A1 | 5/2006 | Liu et al. |
| 2006/0143293 A1 | 6/2006 | Freedman |
| 2006/0155823 A1 | 7/2006 | Tran et al. |
| 2006/0161541 A1 | 7/2006 | Cencini |
| 2006/0168088 A1 | 7/2006 | Leighton et al. |

| | | |
|---|---|---|
| 2006/0190605 A1 | 8/2006 | Franz et al. |
| 2006/0193247 A1 | 8/2006 | Naseh et al. |
| 2006/0233155 A1 | 10/2006 | Srivastava |
| 2006/0253546 A1 | 11/2006 | Chang et al. |
| 2006/0253609 A1 | 11/2006 | Andreev et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2007/0005689 A1 | 1/2007 | Leighton et al. |
| 2007/0005892 A1 | 1/2007 | Mullender et al. |
| 2007/0014241 A1 | 1/2007 | Banerjee et al. |
| 2007/0041393 A1 | 2/2007 | Westhead et al. |
| 2007/0050522 A1 | 3/2007 | Grove et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0174426 A1 | 7/2007 | Swildens et al. |
| 2007/0183342 A1 | 8/2007 | Wong et al. |
| 2007/0208737 A1 | 9/2007 | Li et al. |
| 2007/0244964 A1 | 10/2007 | Challenger et al. |
| 2007/0266113 A1 | 11/2007 | Koopmans et al. |
| 2008/0005057 A1 | 1/2008 | Ozzie et al. |
| 2008/0008089 A1 | 1/2008 | Bornstein et al. |
| 2008/0046596 A1 | 2/2008 | Afergan et al. |
| 2008/0071987 A1 | 3/2008 | Karn et al. |
| 2008/0072264 A1 | 3/2008 | Crayford |
| 2008/0086574 A1 | 4/2008 | Raciborski et al. |
| 2008/0147866 A1 | 6/2008 | Stolorz et al. |
| 2008/0155061 A1 | 6/2008 | Afergan et al. |
| 2008/0155614 A1 | 6/2008 | Cooper et al. |
| 2008/0162667 A1 | 7/2008 | Verma et al. |
| 2008/0228920 A1 | 9/2008 | Souders et al. |
| 2008/0235400 A1 * | 9/2008 | Slocombe et al. ............ 709/245 |
| 2008/0275772 A1 | 11/2008 | Suryanarayana et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0319862 A1 | 12/2008 | Golan et al. |
| 2009/0013063 A1 | 1/2009 | Soman |
| 2009/0016236 A1 | 1/2009 | Alcala et al. |
| 2009/0049098 A1 | 2/2009 | Pickelsimer et al. |
| 2009/0070533 A1 | 3/2009 | Elazary et al. |
| 2009/0086741 A1 | 4/2009 | Zhang |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125934 A1 | 5/2009 | Jones et al. |
| 2009/0144412 A1 | 6/2009 | Ferguson et al. |
| 2009/0157850 A1 | 6/2009 | Gagliardi et al. |
| 2009/0164331 A1 | 6/2009 | Bishop et al. |
| 2009/0177667 A1 | 7/2009 | Ramos et al. |
| 2009/0182815 A1 | 7/2009 | Czechowski et al. |
| 2009/0182945 A1 | 7/2009 | Aviles et al. |
| 2009/0204682 A1 | 8/2009 | Jeyaseelan et al. |
| 2009/0210549 A1 | 8/2009 | Hudson et al. |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0259971 A1 | 10/2009 | Rankine et al. |
| 2009/0271577 A1 | 10/2009 | Campana et al. |
| 2009/0271730 A1 | 10/2009 | Rose et al. |
| 2009/0279444 A1 | 11/2009 | Ravindran et al. |
| 2009/0287750 A1 | 11/2009 | Banavar et al. |
| 2009/0307307 A1 | 12/2009 | Igarashi |
| 2009/0327517 A1 | 12/2009 | Sivasubramanian et al. |
| 2010/0005175 A1 | 1/2010 | Swildens et al. |
| 2010/0011061 A1 | 1/2010 | Hudson et al. |
| 2010/0023601 A1 | 1/2010 | Lewin et al. |
| 2010/0030662 A1 | 2/2010 | Klein |
| 2010/0036944 A1 | 2/2010 | Douglis et al. |
| 2010/0088367 A1 | 4/2010 | Brown et al. |
| 2010/0100629 A1 | 4/2010 | Raciborski et al. |
| 2010/0111059 A1 | 5/2010 | Bappu et al. |
| 2010/0122069 A1 | 5/2010 | Gonion |
| 2010/0125673 A1 | 5/2010 | Richardson et al. |
| 2010/0125675 A1 | 5/2010 | Richardson et al. |
| 2010/0192225 A1 | 7/2010 | Ma et al. |
| 2010/0217801 A1 | 8/2010 | Leighton et al. |
| 2010/0226372 A1 | 9/2010 | Watanabe |
| 2010/0257566 A1 | 10/2010 | Matila |
| 2010/0332595 A1 | 12/2010 | Fullagar et al. |

OTHER PUBLICATIONS

Liu et al., "Combined mining of Web server logs and web contents for classifying user navigation patterns and predicting users' future requests," Data & Knowledge Engineering 61 (2007) pp. 304-330.

Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.

Xu et al., "Decision tree regression for soft classification of remote sensing data", Remote Sensing of Environment 97 (2005) pp. 322-336.

* cited by examiner

REQUEST ROUTING

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider would provide client computing devices data associated with the Web page as well as the data associated with the embedded resources.

Some content providers attempt to facilitate the delivery of requested content, such as Web pages and/or resources identified in Web pages, through the utilization of a content delivery network ("CDN") service provider. A CDN server provider typically maintains a number of computing devices in a communication network that can maintain content from various content providers. In turn, content providers can instruct, or otherwise suggest to, client computing devices to request some, or all, of the content provider's content from the CDN service provider's computing devices.

With reference to previous illustrative example, the content provider can leverage a CDN service provider with the modification or substitution of resource identifiers associated with the embedded resources. Specifically, the resource identifiers can reference a computing device associated with the CDN service provider such that the client computing device would transmit the request for the additional resources to the referenced CDN service provider computing device. Typically, the content provider facilitates the utilization of a CDN provider by including CDN-provider specific resources identifiers in requested content (e.g., Web pages). This approach generally corresponds to an "offline" process implemented by the content provider in advance of receipt of a request for the original content from the client computing devices. Accordingly, modifications to resource identifiers, such as to provide alternative resources identifiers for the same CDN service provider, to provide additional information utilized by CDN service providers in processing the request for content and/or to identify alternative CDN service providers, can become inefficient as they typically require implementation of the offline process the content provider.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present disclosure is directed to routing of DNS query from a client computing device corresponding to content requests by a network resource, such as content delivery network ("CDN") service providers. Specifically, aspects of the disclosure will be described with regard to the routing of a client computing device DNS query within a content delivery network service provider domain utilizing one or more alternative resource identifiers. Although various aspects of the disclosure will be described with regard to illustrative examples and embodiments, one skilled in the art will appreciate that the disclosed embodiments and examples should not be construed as limiting.

Figure 1:
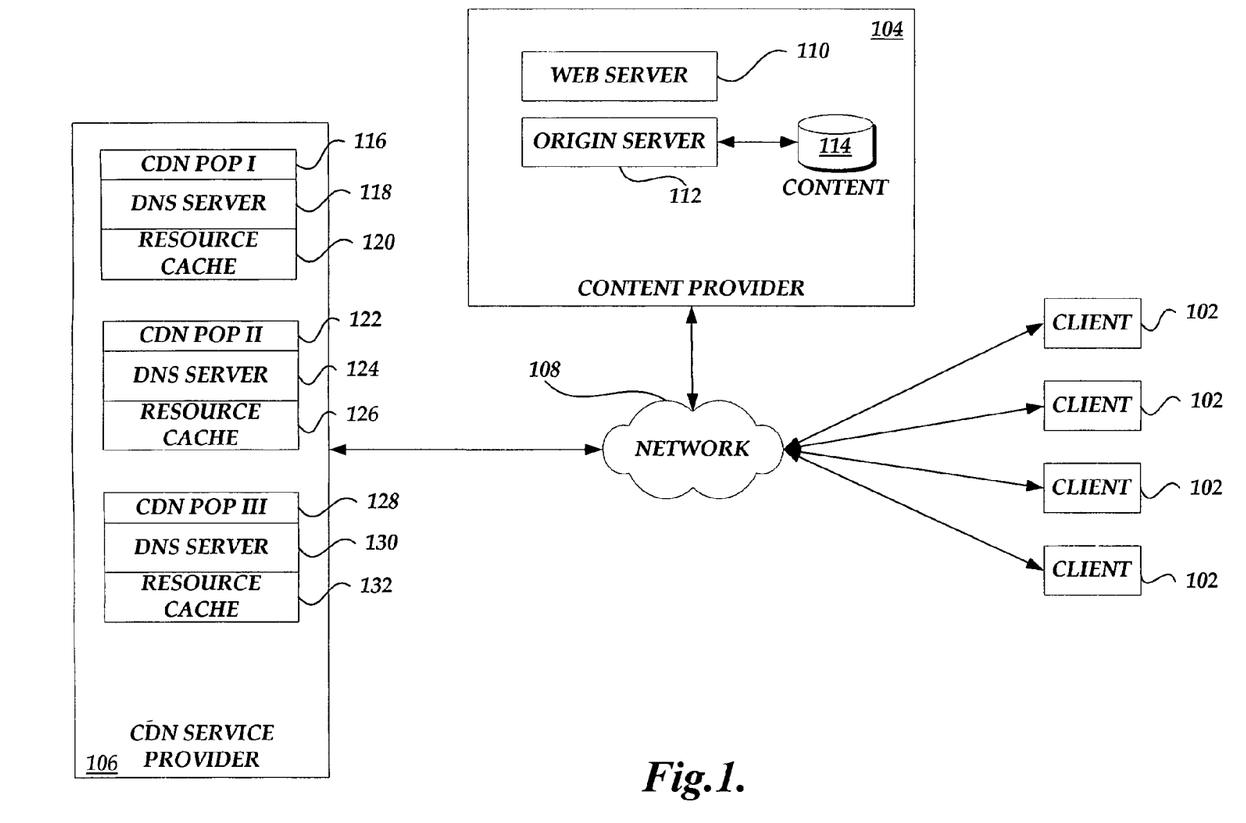
FIG. 1 is a block diagram illustrative of content delivery environment including a number of client computing devices, content provider, and a content delivery network service provider.

FIG. 1 is a block diagram illustrative of content delivery environment 100 for the management and processing of content requests. As illustrated in FIG. 1, the content delivery environment 100 includes a number of client computing devices 102 (generally referred to as clients) for requesting content from a content provider and/or a CDN service provider. In an illustrative embodiment, the client computing devices 102 can corresponds to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 utilizes some type of local DNS resolver component, such as a DNS Name server, that generates the DNS queries attributed to the client computing device. In one embodiment, the local DNS resolver component may be provide by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102. The content provider 104 can further include an origin server component 112 and associated storage component 114 corresponding to one or more computing devices for obtaining and processing requests for network resources from the CDN service provider. One skilled in the relevant art will appreciate that the content provider 104 can be associated with various additional computing resources, such additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

With continued reference to FIG. 1, the content delivery environment 100 can further include a CDN service provider 106 in communication with the one or more client computing devices 102 and the content providers 104 via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each POP 116, 122, 128 includes a DNS component 118, 124, 130 made up of a number of DNS server computing devices for resolving DNS queries from the client computers 102. Each POP 116, 122, 128 also includes a resource cache component 120, 126, 132 made up of a number of cache server computing devices for storing resources from content providers and transmitting various requested resources to various client computers. The DNS components 118, 124 and 130 and the resource cache components 120, 126 132 may further include additional software and/or hardware components that facilitate communications including, but not limited to, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the POPs 116, 122, 128 are illustrated in FIG. 1 as logically associated with the CDN Provider 106, the POPs will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, and the like.

With reference now to FIGS. 2-7, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
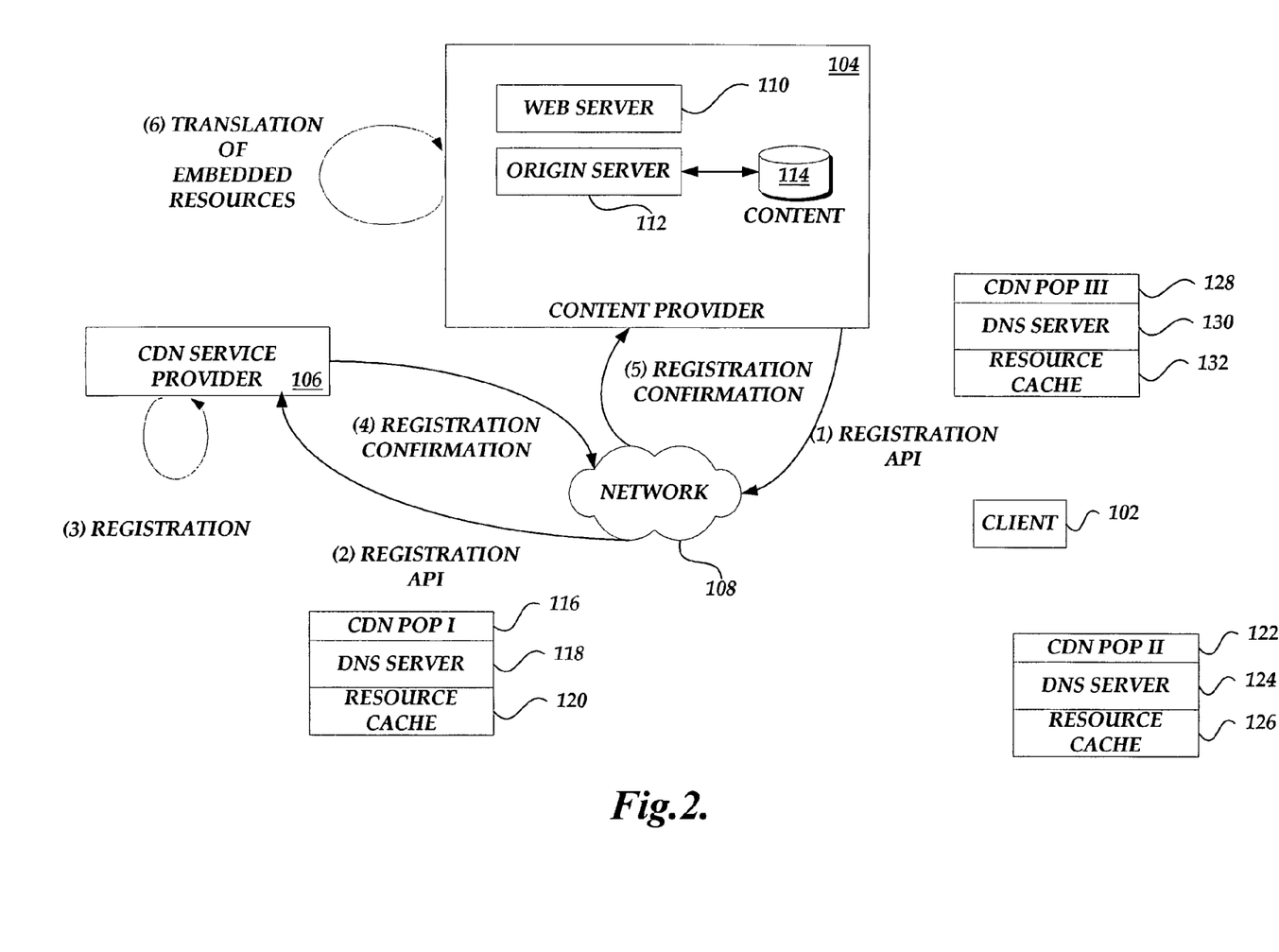
FIG. 2 is a block diagram of the content delivery environment of FIG. 1 illustrating the registration of a content provider with a content delivery service provider.

With reference to FIG. 2, an illustrative interaction for registration of a content provider 104 with the CDN service provider 106 will be described. As illustrated in FIG. 2, the CDN content registration process begins with registration of the content provider 104 with the CDN service provider 106. In an illustrative embodiment, the content provider 104 utilizes a registration application program interface ("API") to register with the CDN service provider 106 such that the CDN service provider 106 can provide content on behalf of the content provider 104. The registration API includes the identification of the origin server 112 of the content provider 104 that will provide requested resources to the CDN service provider 106.

One skilled in the relevant art will appreciate that upon identification of appropriate origin servers 112, the content provider 104 can begin to direct requests for content from client computing devices 102 to the CDN service provider 106. Specifically, in accordance with DNS routing principles, a client computing device request corresponding to a resource identifier would eventually be directed toward a POP 116, 122, 128 associated with the CDN service provider 106. In the event that the resource cache component 120, 126, 132 of a selected POP does not have a copy of a resource requested by a client computing device 102, the resource cache component will request the resource from the origin server 112 previously registered by the content provider 104.

With continued reference to FIG. 2, upon receiving the registration API, the CDN service provider 106 obtains and processes the registration information. In an illustrative embodiment, the CDN service provider 106 can then generate additional information that will be used by the client computing devices 102 as part of the content requests. The additional information can include, without limitation, client identifiers, such as client identification codes, content provider identifiers, such as content provider identification codes, executable code for processing resource identifiers, such as script-based instructions, the like. One skilled in the relevant art will appreciate that various types of additional information may be generated by the CDN service provider 106 and that the additional information may be embodied in any one of a variety of formats.

The CDN service provider 106 returns an identification of applicable domains for the CDN service provider (unless it has been previously provided) and any additional information to the content provider 104. In turn, the content provider 104 can then process the stored content with content provider specific information. In one example, as illustrated in FIG. 2, the content provider 104 translates resource identifiers originally directed toward a domain of the origin server 112 to a domain corresponding to the CDN service provider. The translated URLs are embedded into requested content in a manner such that DNS queries for the translated URLs will resolve to a DNS sever corresponding to the CDN service provider 106 and not a DNS server corresponding to the content provider 104. Although the translation process is illustrated in FIG. 2, in some embodiments, the translation process may be omitted in a manner described in greater detail below.

Generally, the identification of the resources originally directed to the content provider 104 will be in the form of a resource identifier that can be processed by the client computing device 102, such as through a browser software application. In an illustrative embodiment, the resource identifiers can be in the form of a uniform resource locator ("URL"). Because the resource identifiers are included in the requested content directed to the content provided, the resource identifiers can be referred to generally as the "content provider URL." For purposes of an illustrative example, the content provider URL can identify a domain of the content provider 104 (e.g., contentprovider.com), a name of the resource to be requested (e.g., "resource.xxx") and a path where the resource will be found (e.g., "path"). In this illustrative example, the content provider URL has the form of:

http://www.contentprovider.com/path/resource.xxx

During an illustrative translation process, the content provider URL is modified such that requests for the resources associated with the translated URLs resolve to a POP associated with the CDN service provider 106. In one embodiment, the translated URL identifies the domain of the CDN service provider 106 (e.g., "cdnprovider.com"), the same name of the resource to be requested (e.g., "resource.xxx") and the same path where the resource will be found (e.g., "path"). Additionally, the translated URL can include additional processing information (e.g., "additional information"). The translated URL would have the form of:

http://additional_information.cdnprovider.com/path/resources.xxx

Figure 3:
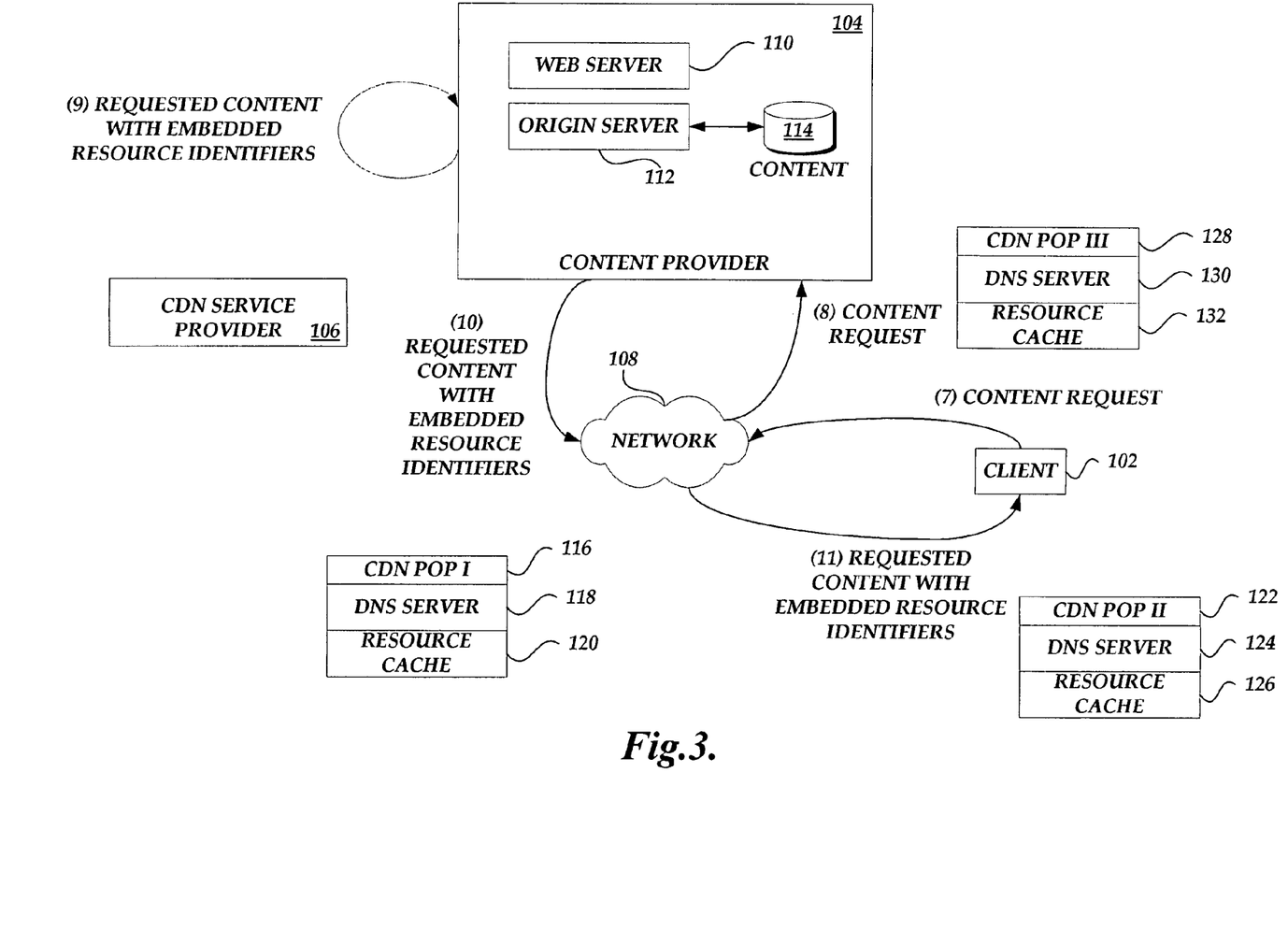
FIG. 3 is a block diagram of the content delivery environment of FIG. 1 illustrating the generation and processing of a content request from a client computing device to a content provider.

In another embodiment, the information associated with the CDN service provider 106 is included the modified URL, such as through prepending or other techniques, such that the translated URL can maintain all of the information associated with the original URL. In this embodiment, the translated URL would have the form of:

http://additional_information.cdnprovider.com/www.contentprovider.com/path /resource.xxx With reference now to FIG. 3, after completion of the registration and translation processes illustrated in FIG. 2, a client computing device 102 subsequently generates a content request that is received and processed by the content provider 104, such as through the Web server 110. In accordance with an illustrative embodiment, the request for content can be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers, described above, that corresponds to resource objects that should be obtained by the client computing device 102 as part of the processing of the requested content. The embedded resource identifiers can be generally referred to as original resource identifiers or original URLs.

Upon receipt of the requested content, the client computing device 102, such as through a browser software application, begins processing any of the markup code included in the content and attempts to acquire the resources identified by the embedded resource identifiers. Accordingly, the first step in acquiring the content correspond to the issuance, by the client computing device 102 (through its local DNS resolver), a DNS query for the Original URL resource identifier that results in the identification of a DNS server authoritative to the "." and the "com" portions of the translated URL. After resolving the "." and "com" portions of the embedded URL, the client computing device 102 then issues a DNS query for the resource URL that results in the identification of a DNS server authoritative to the ".cdnprovider" portion of the embedded URL. The issuance of DNS queries corresponding to the "." and the "com" portions of a URL are well known and have not been illustrated.

Figure 4:
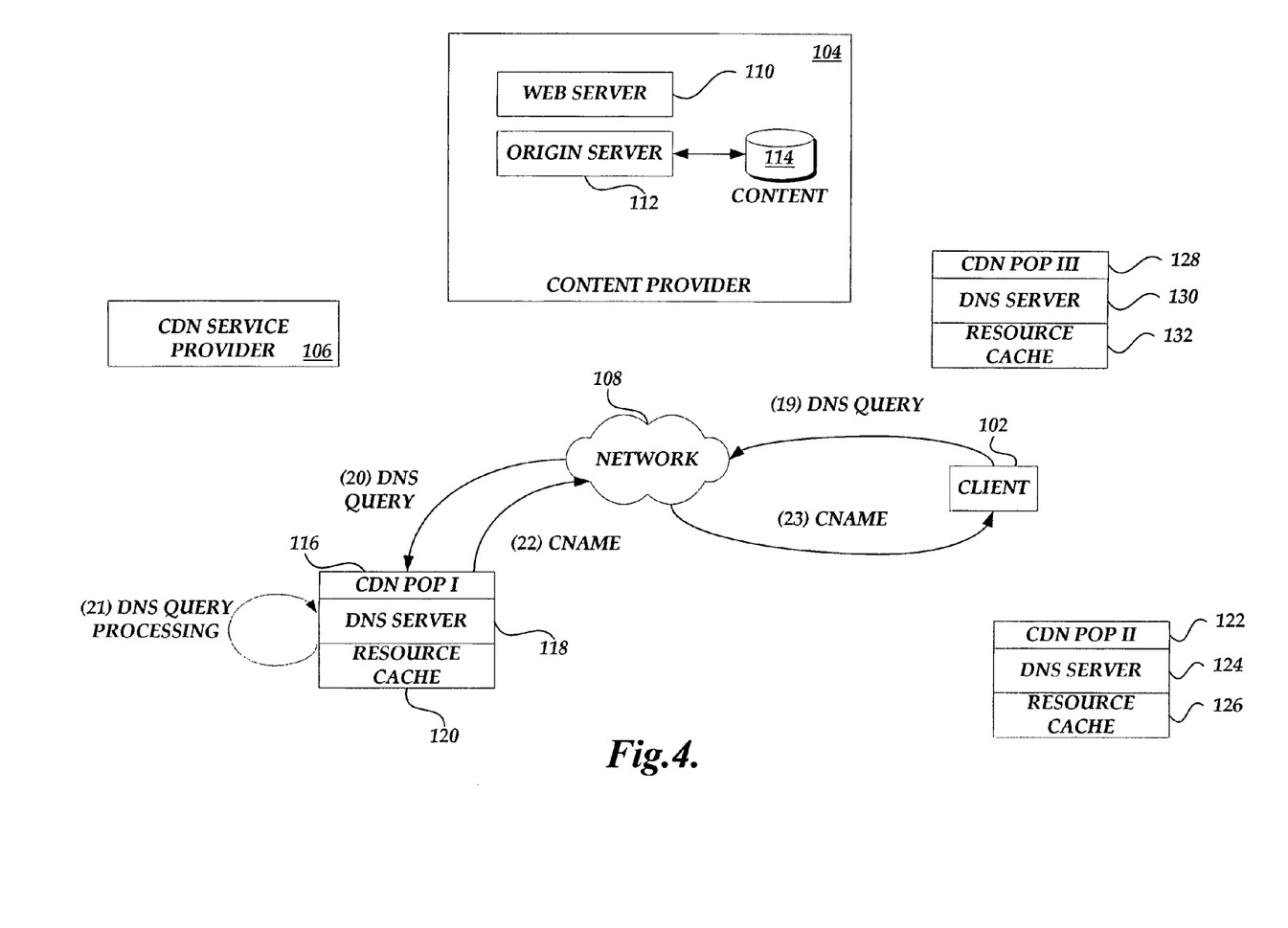
FIG. 4 is a block diagram of the content delivery environment of FIG. 1 illustrating the generation and processing of a DNS query corresponding to an embedded resource from a client computing device to a content delivery network service provider.

With reference now to FIG. 4, in an illustrative embodiment, the successful resolution of the "cdnprovider" portion of the original URL identifies a network address, such as an IP address, of a DNS server associated with the CDN service provider 106. In one embodiment, the IP address is a specific network address unique to a DNS server component of a POP. In another embodiment, the IP address can be shared by one or more POPs. In this embodiment, a further DNS query to the shared IP address utilizes a one-to-many network routing schema, such as anycast, such a specific POP will receive the request as a function of network topology. For example, in an anycast implementation, a DNS query issued by a client computing device 102 to a shared IP address will arrive at a DNS server component logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a POP.

With continued reference to FIG. 4, in either of the above identified embodiments (or any other embodiment), a specific DNS server in the DNS component 118 of a POP 116 receives the DNS query corresponding to the original URL from the client computing device 102. Once one of the DNS servers in the DNS component 118 receives the request, the specific DNS server attempts to resolve the request. In an illustrative embodiment, a specific DNS server can resolve the DNS query by identifying an IP address of a cache server component that will process the request for the requested resource. As described above, a selected resource cache component can process the request by either providing the requested resource if it is available or attempt to obtain the requested resource from another source, such as a peer cache server computing device or the origin server 112 of the content provider 104.

As an alternative to selecting a cache server component, the CDN service provider 106 can maintain sets of various alternative resource identifiers. The alternative resource identifiers can be provided by the CDN service provider 106 to the client computing device 102 such that a subsequent DNS query on the alternative resource identifier will resolve to a different DNS server component within the CDN service provider's network. In an illustrative embodiment, the alternative resource identifiers are in the form of one or more canonical name ("CNAME") records. In one embodiment, each CNAME record identifies a domain of the CDN service provider 106 (e.g., "cdnprovider.com" or "cdnprovider-1.com"). As will be explained in greater detail below, the domain in the CNAME does not need to be the same domain found in original URL or in a previous CNAME record. Additionally, each CNAME record includes additional information, such as request routing information, (e.g., "request routing information"). An illustrative CNAME record can have the form of:

http://request_routing_information.cdnprovider.com

In an illustrative embodiment, the CNAME records are generated and provided by the DNS servers to direct a more appropriate DNS server of the CDN service provider 106. As used in accordance with the present disclosure, appropriateness can be defined in any manner by the CDN service provider 106 for a variety of purposes. In one example, the CDN service provider 106 can attempt to direct a DNS query to DNS severs according to geographic criteria. The geographic criteria can correspond to geographic-based regional service plans contracted between the CDN service-provider 106 and the content provider 104 in which various CDN service provider 106 POPs are grouped into geographic regions. Accordingly, a client computing device 102 DNS query received in a region not corresponding to the content provider's regional plan may be better processed by a DNS server in region corresponding to the content provider's regional plan. In this example, the DNS server component 118 may also obtain geographic information from the client directly (such as information provided by the client computing device or ISP) or indirectly (such as inferred through a client computing device's IP address).

In another example, the CDN service provider 106 can attempt to direct a DNS query to DNS severs according to service level criteria. The service level criteria can correspond to service or performance metrics contracted between the CDN service provider 106 and the content provider 104. Examples of performance metrics can include latencies of data transmission between the CDN service provider POPs and the client computing devices 102, total data provided on behalf of the content provider 104 by the CDN service provider POPs, error rates for data transmissions, and the like.

In still a further example, the CDN service provider 106 can attempt to direct a DNS query to DNS severs according to network performance criteria. The network performance criteria can correspond to measurements of network performance for transmitting data from the CDN service provider POPs to the client computing device 102. Examples of network performance metrics can include network data transfer latencies (measured by the client computing device or the CDN service provider 106, network data error rates, and the like.

In accordance with an illustrative embodiment, the DNS server maintains a data store that defines CNAME records for various original URLs. If a DNS query corresponding to a particular original URL matches an entry in the data store, the DNS server component 118 returns a CNAME record as defined in the data store. In an illustrative embodiment, the data store can include multiple CNAME records corresponding to a particular original URL. The multiple CNAME records would define a set of potential candidates that can be returned to the client computing device. In such an embodiment, the DNS server component 118, either directly or via a network-based service, can implement additional logic in selecting an appropriate CNAME from a set of possible of CNAMEs. In an illustrative embodiment, each DNS server component 118, 124, 130 maintains the same data stores that define CNAME records, which can be managed centrally by the CDN service provider 106. Alternatively, each DNS server component 118, 124, 130 can have a POP specific data stores that define CNAME records, which can be managed centrally by the CDN service provider 106 or locally at the POP 116, 122, 128.

The returned CNAME can also include request routing information that is different from or in addition to the information provided in URL/CNAME of the current DNS query. For example, if the CNAME selection is based on regional plan, a specific regional plan can be identified in the "request_routing_information" portion of the specific CNAME record. A similar approach could be taken to identify service level plans and file management by including a specific identifier in the "request_routing_information" portion of the CNAME record. In another embodiment, request routing information can be found in the identification of a CDN service provider 106 domain different from the domain found in the current URL/CNAME. For example, if the CNAME is based on regional plan, a specific regional plan domain (e.g., "cdnprovder-region1.com") could be used in the domain name portion of the specific CNAME record. Any additional request routing information can be prepended to the existing request routing information in the current URL/CNAME such that the previous request routing information would not be lost (e.g., http://serviceplan.regionalplan.cdn-provider.com). One skilled in the relevant art will appreciate that additional or alternative techniques and/or combination of techniques may be used to include the additional request routing information in the CNAME record that is selected by the DNS server component 118.

With continued reference to FIG. 4, one skilled in the relevant art DNS server component 118 may select (or otherwise obtain) a CNAME record that is intended resolve to a more appropriate DNS server of the CDN service provider 106. In may be possible, however, that the same DNS server would also be authoritative for the subsequent DNS query for the CNAME to be provided to the client computing device. For example, a specific DNS server may be authoritative for a both a specific regional plan and a service level plan. Thus, returning a CNAME would still result in the DNS query arriving at the same DNS query (may due in part to the client computing device's geography). In such an embodiment, the DNS server, such as DNS server component 118, may choose to resolve the future DNS query in advance.

Figure 5:
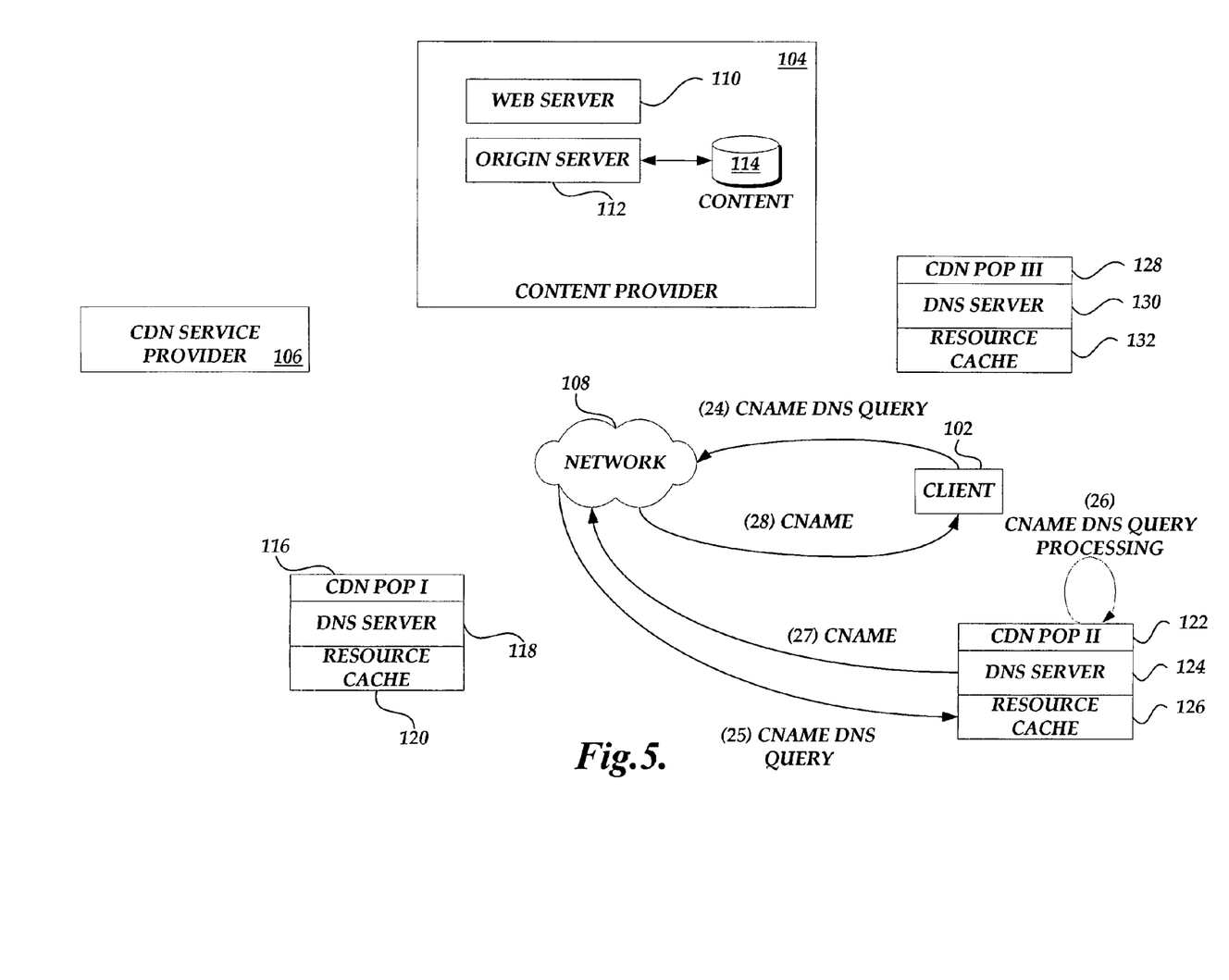
FIG. 5 is a block diagram of the content delivery environment of FIG. 1 illustrating the generation and processing of a DNS query corresponding to a first alternative resource identifier from a client computing device to a content delivery network service provider.

With reference now to FIG. 5, upon receipt of the CNAME from the DNS server component 118, the client computing device 102 generates a subsequent DNS query corresponding to the CNAME. As previously discussed with regard to FIG. 4, the DNS query process could first start with DNS queries for the "." and "com" portions, followed by a query for the "cdnprovider" portion of the CNAME. To the extent, however, that the results of a previous DNS queries can be cached (and remain valid), the client computing device 102 can utilize the cached information and does not need to repeat the entire process. However, at some point, depending on whether the CNAME provided by DNS server component 118 (FIG. 4) and the previous URL/CNAME share common CDN service provider domains, resolves to a different POP provided by the CDN service provider 106. As illustrated in FIG. 5, the DNS server component 124 of POP 122 is now authoritative based on the different information in the current CNAME previously provided by the DNS server component 118. As previously described, the DNS server component 124 can then determine whether to resolve the DNS query on the CNAME with an IP address of a cache component that will process the content request or whether to provide another alternative resource identifier selected in the manner described above.

Figure 6:
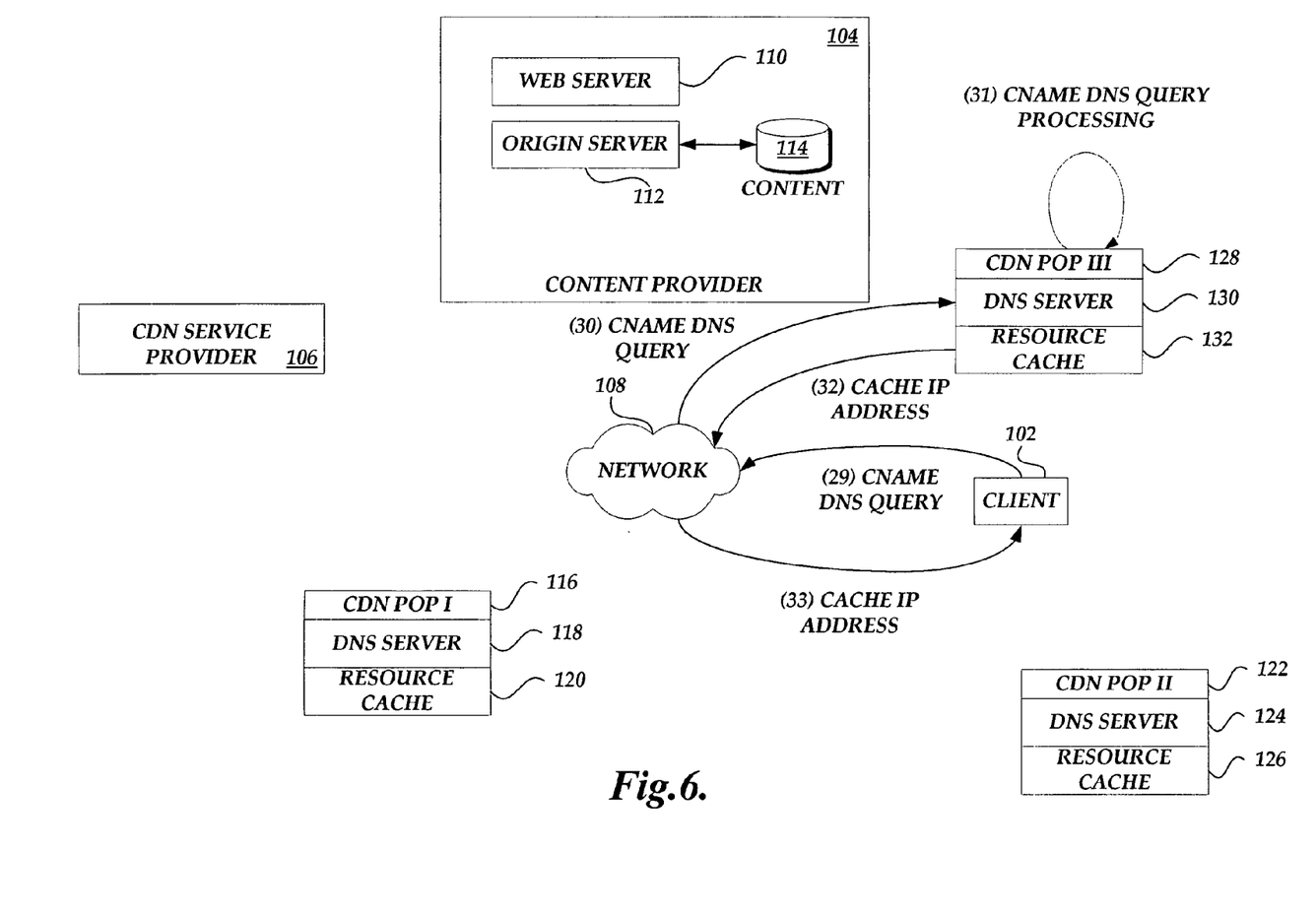
FIG. 6 is a block diagram of the content delivery environment of FIG. 1 illustrating the generation and processing of a DNS query corresponding to a second alternative resource identifier from a client computing device to a content delivery network service provider.

For purposes of illustration, assume that the DNS server component 118 determines that the DNS query corresponding to the current CNAME (provided by DNS server component 116) also corresponds to a CNAME record in its data store. In such an example, the DNS server component 124 would do any necessary processing to select a specific CNAME and return the CNAME to the client computing device. With reference now to FIG. 6, the client computing device 102 would now transmit a second subsequent DNS query corresponding to the CNAME provided by DNS server component 124 (FIG. 5). In accordance with DNS query processes already described, the DNS query would illustratively be received by the DNS server component 130 of POP 128. Again, the DNS server component 130 can then determine whether to resolve the DNS query on the CNAME with an IP address of a cache component that will process the content request or whether to provide another alternative resource identifier selected in the manner described above. In this example, the DNS server component 130 returns an IP address.

In an illustrative embodiment, the DNS server components, such as DNS server component 130, can utilize a variety of information in selecting a resource cache component. In one example, the DNS server component can default to a selection of a resource cache component of the same POP. In another example, the DNS server components can select a resource cache component based on various load balancing or load sharing algorithms. Still further, the DNS server components can utilize network performance metrics or measurements to assign specific resource cache components. The IP address selected by a DNS server component may correspond to a specific caching server in the resource cache. Alternatively, the IP address can correspond to a hardware/software selection component (such as a load balancer).

Figure 7:
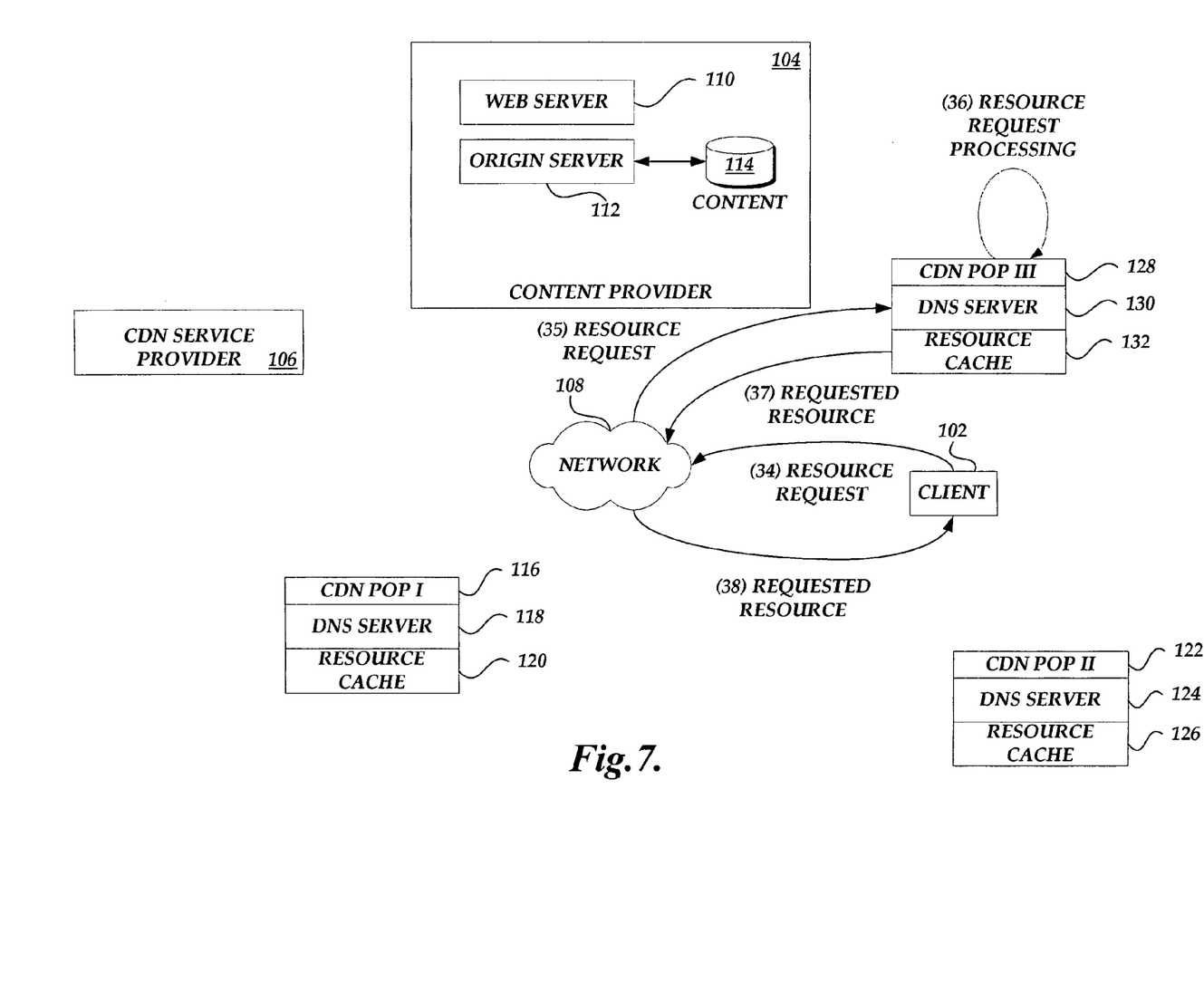
FIG. 7 is a block diagram of the content delivery environment of FIG. 1 illustrating the generation and processing of embedded resource requests from a client computing device to a content delivery network service provider.

With reference now to FIG. 7, in an illustrative example, assume that the DNS server component 130 has selected the resource cache component 132 of POP 128. Upon receipt of the IP address for the resource cache component 132, the client computing device 102 transmits requests for the requested content to the resource cache component 132. The resource cache component 132 processes the request in a manner described above and the requested content is transmitted to the client computing device 102.

Figure 8:
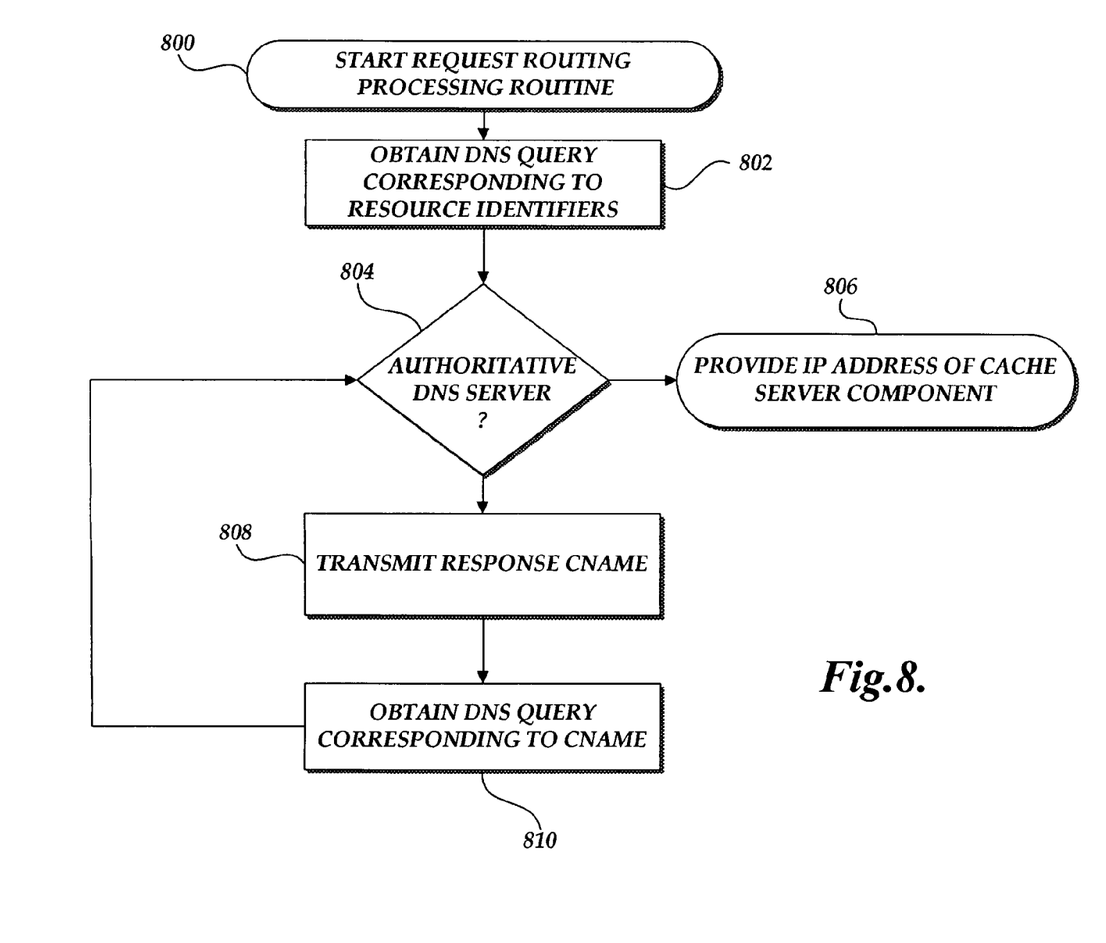
FIG. 8 is a flow diagram illustrative of a request routing routine implemented by a content delivery network service provider utilization a series of alternative resource identifiers.

With reference now to FIG. 8, a request routine 800 implemented by the CDN provider 106 will be described. One skilled in the relevant art will appreciate that actions/steps outlined for routine 800 may be implemented by one or many computing devices/components that are associated with the CDN service provider 106. Accordingly, routine 800 has been logically associated as being performed by the CDN service provider 106.

At block 802, one of the DNS server components 118, 124, 130 receives a DNS query corresponding to resource identifier. As previously discussed, the resource identifier can be a URL that has been embedded in content requested by the client computing device 102 and previously provided by the content provider 104. Alternatively, the resource identifier can also correspond to a CNAME provided by a content provider DNS server in response to a DNS query previously received from the client computing device 102. At decision block 804, a test is conducted to determine whether the current DNS server is authoritative to resolve the DNS query. In an illustrative embodiment, the DNS server can determine whether it is authoritative to resolve the DNS query if there are no CNAME records corresponding to the received resource identifier. Alternative or additional methodologies may also be practiced to determine whether the DNS server is authoritative.

If the current DNS server is authoritative (including a determination that the same DNS server will be authoritative for subsequent DNS queries), the current DNS server resolves the DNS query by returning the IP address of cache server component. In a non-limiting manner, a number of methodologies for selecting an appropriate resource cache component have been previously discussed. Additionally, as described above, the IP address may correspond to a specific cache server of a resource cache component or generally to group of cache servers.

Alternatively, if at decision block 804 the DNS server is not authoritative, at block 808, the DNS server component selects and transmits an alternative resource identifier. As described above, the DNS server component can utilize a data store to identify an appropriate CNAME as a function of the current DNS query. Additionally, the DNS server component can also implement additional logical processing to select from a set of potential CNAMES. At block 810, different DNS server components 118, 124, 130 receive a DNS query corresponding to the CNAME. The routine 800 then returns to decision block 804 and continues to repeat as appropriate.

While illustrative embodiments have been disclosed and discussed, one skilled in the relevant art will appreciate that additional or alternative embodiments may be implemented within the spirit and scope of the present invention. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for request routing comprising:
    obtaining a DNS query from a client computing device at a first DNS server, wherein the DNS query corresponds to a requested resource associated with an original resource identifier provided by a content provider and wherein the first DNS server corresponds to a content delivery network service provider that is different from the content provider;
    determining whether the first DNS server is authoritative to the DNS query;
    obtaining an alternative resource identifier based on information associated with the client computing device and the content provider if the DNS server is determined not to be authoritative, wherein the alternative resource identifier includes information for causing a DNS query to resolve to a domain corresponding to the content delivery service provider and request routing information not included in the original resource identifier;
    transmitting the alternative resource identifier to the client computing device;
    obtaining a subsequent DNS query from the client computing device at a second DNS server, wherein the subsequent DNS query is based on the alternative resource identifier provided by the content delivery network service provider and wherein the second DNS server corresponds to the content delivery network service provider that is different from the content provider;
    determining whether the second DNS server is authoritative to the subsequent DNS query; and
    selecting a cache component for providing content associated with the original resource request if the second DNS server is authoritative to the second DNS query; and
    transmitting a network address identifying the selected cache component if the second DNS server is determined to be authoritative.

2. The method as recited in claim 1, wherein the original resource identifier corresponds to a uniform resource locator provided by the content provider such that the DNS query resolves to a domain corresponding to the content delivery network service provider.

3. The method as recited in claim 1, wherein the original resource identifier corresponds to an alternative resource identifier previously provided by the content provider such that the DNS query resolves to a domain corresponding to the content delivery network service provider.

4. The method as recited in claim 1, wherein the alternative resource identifier corresponds to a canonical name record identifier.

5. The method as recited in claim 1, wherein the original resource identifier and the alternative resource identifier include information identifying a same domain corresponding to the content delivery service provider.

6. The method as recited in claim 1, wherein the original resource identifier includes information identifying a first domain corresponding to the content delivery service provider and wherein the alternative resource identifier includes information identifying a second domain corresponding to the content delivery service provider.

7. The method as recited in claim 1, wherein the information associated with the content provider includes regional service information and wherein the alternative resource identifier includes information identifying a regional service plan provided by the content delivery network service provider.

8. The method as recited in claim 1, wherein the information associated with the content provider includes service level information and wherein the alternative resource identifier includes information identifying a service level plan provided by the content delivery network service provider.

9. The method as recited in claim 1, wherein the information associated with the content provider includes file information corresponding to the requested content and wherein the alternative resource identifier includes information identifying a file processing plan provided by the content delivery network service provider.

10. The method as recited in claim 1, wherein the information associated with the client computing device corresponds to a geographic location of the client computing device.

11. The method as recited in claim 1 further comprising:
    obtaining a second alternative resource identifier based on information associated with the client computing device and the content provider if the second DNS server is determined not to be authoritative to the subsequent DNS query, wherein the second alternative resource identifier includes information for causing a DNS query to resolve to a domain corresponding to the content delivery service provider and request routing information not included in the original resource identifier or the alternative resource identifier;
    transmitting the alternative resource identifier to the client computing device;
    obtaining a second subsequent DNS query from the client computing device at a third DNS server, wherein the second subsequent DNS query is based on the second alternative resource identifier provided by the content delivery network service provider and wherein the third DNS server corresponds to the content delivery network service provider that is different from the content provider;
    determining whether the third DNS server is authoritative to the second subsequent DNS query; and
    selecting a cache component for providing content associated with the original resource request if the third DNS server is authoritative to the second subsequent DNS query; and
    transmitting information identifying the selected cache component if the third DNS server is determined to be authoritative to the second subsequent DNS query.

12. The method as recited in claim 1 further comprising:
    obtaining a request from the client computing device for the requested content; and
    transmitting the requested content from the selected cache component in response to the request from the client computing device.

13. A method for request routing comprising:
    obtaining a DNS query from a client computing device at a first DNS server, wherein the DNS query corresponds to a requested resource associated with a first resource identifier and wherein the first DNS server corresponds to a content delivery network service provider;

determining that the first resource identifier is associated with an alternative resource identifier;

transmitting the alternative resource identifier to the client computing device, wherein the alternative resource identifier includes information for causing a DNS query to resolve to a domain corresponding to the content delivery service provider and supplemental request routing information not included in the first resource identifier;

obtaining a subsequent DNS query from the client computing device at a second DNS server, wherein the subsequent DNS query is based on the alternative resource identifier provided by the content delivery network service provider and wherein the second DNS server corresponds to the content delivery network service provider;

resolving the subsequent DNS query, at the second DNS server, to identify a cache component for providing content associated with the original resource request; and transmitting a network address identifying the identified cache component to the client computing device.

14. The method as recited in claim 13, wherein first resource identifier corresponds to a uniform resource locator such that the DNS query resolves to a domain corresponding to the content delivery network service provider.

15. The method as recited in claim 13, wherein the first resource identifier corresponds to an alternative resource identifier such that the DNS query resolves to a domain corresponding to the content delivery network service provider.

16. The method as recited in claim 13, wherein the alternative resource identifier corresponds to a canonical name record identifier.

17. The method as recited in claim 13, wherein the first resource identifier and the alternative resource identifier include information identifying a same domain corresponding to the content delivery service provider.

18. The method as recited in claim 13, wherein the first resource identifier includes information identifying a first domain corresponding to the content delivery service provider and wherein the alternative resource identifier includes information identifying a second domain corresponding to the content delivery service provider.

19. The method as recited in claim 13, wherein determining that the first resource identifier is associated with an alternative resource identifier comprises:

obtaining resource routing information corresponding to a content provider associated with the requested content;

selecting an alternative resource identifier as a function of the resource routing information corresponding to the content provider associated with the requested content.

20. The method as recited in claim 19, wherein the information associated with the content provider includes regional service information and wherein the alternative resource identifier includes information identifying a regional service plan provided by the content delivery network service provider.

21. The method as recited in claim 19, wherein the information associated with the content provider includes service level information and wherein the alternative resource identifier includes information identifying a service level plan provided by the content delivery network service provider.

22. The method as recited in claim 19 further comprising obtaining resource routing information corresponding to the client computing device associated with the DNS query.

23. A system for request routing comprising:

a first network point of presence associated with a content delivery network service provider, wherein the first network point of presence includes a DNS server component that receives a DNS query from a client computing device, wherein the DNS query corresponds to a requested resource associated with a first resource identifier, and wherein the DNS server in the first network point of presence is operable to:

determine that the first resource identifier is associated with an alternative resource identifier; and transmit an alternative resource identifier to the client computing device, wherein the alternative resource identifier includes information for causing a DNS query to resolve to a domain corresponding to the content delivery service provider and supplemental request routing information not included in the first resource identifier;

a second network point of presence associated with a content delivery network service provider, wherein the second network point of presence includes a DNS server component that receives a subsequent DNS query from a client computing device, wherein the subsequent DNS query is based on the alternative resource identifier, and wherein the DNS server in the second network point of presence is operable to:

resolve the subsequent DNS query to identify a cache component for providing content associated with the original resource request; and transmit a network address identifying the identified cache component to the client computing device.

24. The system as recited in claim 23, wherein the first resource identifier corresponds to a uniform resource locator provided by the content provider such that the DNS query resolves to a domain corresponding to the content delivery network service provider.

25. The system as recited in claim 23, wherein the alternative resource identifier corresponds to a canonical name record identifier.

26. The system as recited in claim 23, wherein the information associated with the content provider includes regional service information and wherein the alternative resource identifier includes information identifying a regional service plan provided by the content delivery network service provider.

27. The system as recited in claim 23, wherein the DNS server in the first network point of presence is operable to obtain the information associated with the content provider and wherein the alternative resource identifier includes information identifying a service level plan provided by the content delivery network service provider.

28. The system as recited in claim 23, wherein the DNS server in the first network point of presence is operable to obtain the information associated with the content provider and wherein the alternative resource identifier includes information identifying a file processing plan provided by the content delivery network service provider.

29. The system as recited in claim 23, wherein the DNS server in the first network point of presence is operable to obtain the information corresponding to a geographic location of the client computing device.

30. The system as recited in claim 23, wherein the network address comprises a network address of a cache component in the second network point of presence.

31. The system as recited in claim 23, wherein the network address comprises a network address of a cache component in another network point of presence.

* * * * *